Patented June 22, 1948

2,443,989

UNITED STATES PATENT OFFICE 2,443,989

METHOD FOR PRODUCTION OF PENICILLIN

Andrew J. Moyer, Peoria, Ill., assignor to the United States of America as represented by the Secretary of Agriculture No Drawing. Application May 11, 1945,
Serial No. 593,185

7 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a continuation in part of my copending application Serial No. 530,233, filed April 8, 1944, and abandoned May 27, 1945.

This invention relates to a new and useful method for the production of penicillin.

The method of the present invention comprises cultivating penicillin-producing organisms, such as *Penicillium notatum* Westling, *Penicillium chrysogenum* Thom, *Penicillium baculatum* Westling, and *Penicillium cyaneo-fulvum* Biourge in the submerged condition in contact with an aqueous nutrient medium, containing a source of assimilable carbon, and a proteinaceous material and, in contact with oxygen-containing gases.

In the prior art, penicillin has been produced by cultivation of the fungus *Penicillium notatum* Westling on the surface of suitable nutrient media, such as the Czapek-Dox glucose medium (Abraham et al., Lancet 2:177 (1941)). Such a method of cultivation is very laborious, costly, and time-consuming when practiced on a large scale, as in the commercial production of penicillin. Large numbers of bottles or pans must be washed and sterilized, relatively small volumes of nutrient media must be dispensed into individual containers, and each container with its aliquot of medium must be sterilized and inoculated. Moreover, large rooms are required for the incubation of cultures, since the volume of liquor undergoing fermentation is relatively small compared to the total volume of the room. The incubation period for such cultures is usually 7 to 14 days, and at the conclusion of the fermentation, considerable hand labor is required to remove the penicillin-containing liquors from the numerous fermentation vessels and from the fungus mycelium.

I have found a method for producing penicillin by growing a penicillin-producing organism of the type mentioned submerged in the nutrient medium instead of on the surface, as has been practiced in the previous art. When grown in the submerged state, this fungus assumes entirely different physical forms than when it is grown on the surface. Thus, whereas in surface cultures a more or less continuous pellicle covers the surface of the liquid contained in each fermentation vessel, in submerged cultures the fungus develops as numerous more or less discrete particles which are dispersed throughout the medium. By virtue of this distribution throughout the medium, large volumes of nutrient medium can be subjected to fermentation at one time in suitable large vessels, such as the vats or tanks in common use in the art. The economies of such a method are evident in view of the disadvantages just mentioned for the surface culture method.

I have found that to obtain submerged growth of the fungus, with efficient penicillin production, it is essential that the fermentation mash, comprising the medium and the fungus growth, be agitated and that it be supplied with air or with other oxygen containing gases. Agitation may be provided by a propeller, or similar mechanical agitation devices, by revolving or shaking the fermenter itself, by various pumping devices, or by the passage of air or other gases through the medium. Aeration may be provided by injecting air, or other oxygen-containing gases, into the mash through open pipes, perforated pipes, porous diffusion media, such as carbon sticks, carborundum or glass tubes or plates, or cloth bags, or aeration may be provided by spraying the mash into an oxygen-containing atmosphere or by spilling the mash in thin sheets through an oxygen-containing atmosphere.

When the penicillin-producing organism is propagated in submerged culture subjected to aeration and agitation, on suitable nutrient media, such as that comprising from 5 to 100 g. of proteinaceous materials and from 5 to 100 g. of a source of assimilable carbon per liter of medium, and comprising alkali nitrates, as described in my copending application for patent, Serial No. 593,184, filed May 11, 1945, which is a continuation in part of my copending application Serial No. 530,234, filed April 8, 1944, and abandoned May 27, 1945, there is a rapid production of much larger quantities of penicillin than have been obtained in the prior art. Thus, as much as 80 Oxford units of penicillin per milliliter are obtained in 5 days when the fermentation is conducted in accordance with this invention, whereas only two to eight Oxford units per milliliter were previously obtained in 7 to 14 days. (The Oxford unit has been defined by Abraham et al., Lancet 2: 177 (1941)).

A medium of the following type is suitable:

| | | |
|---|---|---|
| Assimilable carbon source | grams | 5 to 100 |
| Proteinaceous material | do | 5 to 100 |
| $MgSO_4.7H_2O$ | do | 0.1 to 0.5 |
| $KH_2PO_4$ | do | 0.3 to 3.0 |
| $NaNO_3$, $KNO_3$, $Ca(NO_3)_2$, $Mg(NO_3)_2$, $Sr(NO_3)_2$, or $CsNO_3$ | grams | 1 to 5 |
| $ZnSO_4.6H_2O$ | mg | 8 to 80 |
| Ferric tartrate | mg | 10 to 100 |
| Water to make one liter. | | |

Assimilable carbon source includes ions of an assimilable organic acid, polyhydric alcohol and saccharides (carbohydrate). Proteinaceous material includes unmodified protein and protein degradation products, particularly such products as arise from the hydrolysis of the protein. These protein degradation products include proteoses, peptones, polypeptides, peptides, and amino acids.

The success of this method lies in part in the fact that the rapidly assimilated glucose of the Czapek-Dox medium is replaced with a less readily assimilated carbohydrate derivative which serves as a sustained source of energy or nutrition for the fungus throughout substantially the entire fermentation period, and thereby retards the development of conditions adverse to penicillin formation and stability.

Carbohydrates of the class known as polysaccharides, which comprises those carbohydrates containing more than one monosaccharide unit per molecule, are admirably suited for this purpose, since they are acted upon slowly by the fungus or fungus enzymes to yield assimilable sugar, yet are sufficiently resistant to such fungus or enzyme action as to persist in the nutrient medium in considerable quantity throughout the course of the incubation period so as to provide a reservoir for the nutrition of the fungus. The maintenance of such a condition of nutrition is very favorable to the obtaining of high yields of penicillin. The poor penicillin production obtained when glucose is supplied as the carbon source, in the manner of the prior art, is believed to be due to the rapid and complete metabolism of this sugar by the fungus, resulting in a carbohydrate exhaustion of the medium and the creation of an unfavorable environment for penicillin production.

Lactose, starch, raffinose, melibiose, sucrose, inulin, dextrins, molasses, maltose or cereal grain mashes are excellent polysaccharides for the purpose of this invention. Lactose may be supplied either as the purified sugar or as whey or whey concentrate. Starch may be supplied as unmodified starch, or as high fluidity (acid modified) starch, or it may be subjected to the action of acid or of liquefying or dextrinizing enzymes in the course of the preparation of the medium. It is desirable, but not essential, that the starch be present in such concentration and in such a state of modification or liquefaction that the nutrient medium is fluid at the time of inoculation. Modified starch, such as the commercial "90-fluidity" starch, is suitably used, as is also enzyme liquefied starch. Potato starch, corn starch, wheat starch, tapioca starch and rice starch have been found suitable. Sucrose may be used in the form of purified sugar or as cane or beet molasses. Grain mashes, such as corn, wheat, or barley mash, either malted or unmalted, may also be used. Such mashes are particularly suitable because they provide at a low cost not only starch and dextrins, but also an appreciable quantity of minerals, growth factors, and proteinaceous material which are favorable to penicillin production and stabilization in the fermentation medium. Some of the grain mashes, as well as some whey concentrates, are sufficiently rich in protein that extra proteinaceous adjuncts need not be added to the medium. Various mixtures and combinations of the above carbon sources may be used.

Monosaccharides such as glucose, fructose, and arabinose are suitable carbon sources for the purpose of this invention, even though they are more rapidly assimilated than the polysaccharides.

Glucose is a normal component of corn-steeping liquor and, as such, serves as a source of carbon for the penicillin-producing mold.

Ions of assimilable organic acids, such as ions of gluconic, lactic, and citric acids are suitable carbon sources for the purpose of this invention. These organic acids appear to be of the same value as carbon sources as the monosaccharides. Ions of such an organic acid may be used in combination with another assimilable carbon source. Lactic acid is a normal component of corn-steeping liquor and, as such, serves as a carbon source.

Sugar alcohols, which are reduction products of various sugars, are also excellent carbon sources for the purpose of this invention, since they are slowly utilized by the fungus, with substantially the same effect as when polysaccharides are provided. Thus, glycerol, sorbitol, mannitol, dulcitol and erythritol have been found effective, either singly or in combination.

A wide variety of proteinaceous materials is effective in favoring penicillin production and stabilization; thus, corn-steeping liquor, wheat-steeping liquor, acid-hydrolyzed casein, enzyme-hydrolyzed casein, whey or whey concentrate, soybean meal, distillers grain slops, acid-hydrolyzed corn gluten, acid-hydrolyzed wheat gluten, and synthetic mixtures of numerous amino acids have been successfully employed. These proteinaceous materials need not be supplied in a high degree of purity; the less pure materials which carry traces of growth factors and considerable quantities of mineral nutrients are suitable for use. The use of corn-steeping liquor is especially advantageous, since it is a cheap, readily available byproduct of the corn wet-milling industries of this country. Corn-steeping liquor, supplied to the trade as the concentrated (30° Bé.) product, has the approximate analysis: Moisture 40–45 percent; proteins and protein hydrolysis products 25–27 percent; carbohydrate 21–23 percent; and ash 9–10 percent. Since the ash of corn-steeping liquor consists principally of potassium, magnesium, phosphate, and sulfate, the use of this liquor as a constituent of the nutrient medium makes unnecessary the addition of potassium phosphate and magnesium sulfate, and thus simplifies and cheapens the process.

The presence of the nitrate ion is the nutrient medium is esential for good penicillin production. Sodium nitrate, as previously used, is a suitable source of nitrate ion. I have found that, in addition, other nitrates of the alkaline and alkaline earth metals, such as potassium, caesium, calcium, magnesium, and strontium, may be used for this purpose.

The practice of this invention is not restricted as to the type of fermentation vessel employed, the type of agitation means employed, or the manner of providing aeration. Practically any type of vat, provided with aeration and agitation means, can be used. Cylindrical vessels of relatively large height compared to diameter have been found especially suitable, since in such vessels the air, which is usually injected near the bottom of the vessel, is in contact with the fermentation mash for a longer time than when a relatively shallow vessel is employed. Excellent results have been obtained in rotating aluminum drum fermenters (Herrick, Hellbach, and May, Ind. Eng. Chem. 27, 681 (1935)), in which the fermentation medium is spilled in thin sheets through the oxygen-containing atmosphere in the upper portion of the drum while the fungus is growing in the submerged state. For small-scale operations, the shaking or swirling of the fermentation vessel itself serves to effect ample agitation and contacting of the medium with the atmosphere.

In practicing this invention in stationary vat fermenters, it is preferred to supply the air through diffusion devices such as stones, cloth bags, or ceramic candles, so as to obtain relatively small air bubbles; such fine air dispersion has been found to give a more abundant cell growth of the fungus and a more rapid and more efficient production of penicillin than is obtained if the air is injected through open tubes or pipes.

The degrees of agitation and aeration which are optimal for penicillin production are widely variable, due to the fact that these two factors are often, to a large extent, interdependent. When horizontal rotary fermenters are used, agitation and aeration are subject to independent control; under such conditions agitation obtained by revolving the fermenter 5 to 15 times per minute is desirable, while maintaining an aeration rate of 50 to 100 ml. per minute per liter of medium being fermented. This aeration rate is believed to approach the minimum rate compatible with good penicillin production, since in such equipment the supplied air has been found to be used by microorganisms much more efficiently than in other commonly used types of fermentation apparatus.

When stationary vat fermenters are employed for penicillin production, suitable aeration rates vary from the ranges found effective in the horizontal rotary fermenters to as much as 3,000 ml. per minute per liter of medium, depending on the degree of air dispersion and the agitation provided by mechanical means. The most air will be required when the air is injected from open pipes and when no mechanical agitation is provided. Appreciably less air is required if dispersion or diffusion devices, such as those previously mentioned, are used.

Maintaining the fermenter under air pressures of 1 to 3 atmospheres gage pressure, as has been found advantageous in some of the highly oxidative fermentations, has been found unnecessary to secure efficient penicillin production. The preferred method of operation is to maintain a slight positive pressure (of the order of 2 to 5 pounds per square inch gage pressure) within the fermenter to facilitate control of the aeration rate and to prevent the entry of contaminating organisms from without the fermenter.

In addition to facilitating penicillin production, the practice of this invention has an advantage in that the optimum concentration of the constituents in the nutrient medium is appreciably less than in surface culture procedures. I have found that approximately half the nutrient concentration is required for the submerged process as is required for the surface process.

This invention is applicable to many types of mold growth which can be introduced as inoculum. I secure good penicillin production by inoculating submerged cultures with ungerminated mold spores, germinated spores, or vegetative growth which is derived from previous surface or submerged culture procedures. Regardless of its type or the method employed in its preparation, mold mycelium derived from *Penicillium notatum* gives good penicillin production when cultivated in the submerged condition with aeration and agitation.

As typical of the manner in which my invention may be practiced, the following examples are presented, although the details of operation are to be considered in no way restrictive.

Example I

In a sterile horizontal rotary drum fermenter, there was placed 3 liters of medium containing concentrated corn-steeping liquor — 100 ml., $MgSO_4.7H_2O$ — 0.375 g., $KH_2PO_4$ — 0.750 g., $NaNO_3$—6.00 g., $ZnSO_4.7H_2O$—0.066 g., and lactose—66.0 g. The medium was inoculated with 200 ml. of a spore suspension of *Penicillium notatum* Westling. The vessels and contents were maintained at 24° C. The fermenter was revolved 10 revolutions per minute, while air was supplied at a rate of 200 ml. per minute, equivalent to approximately 70 ml. per minute per liter of medium being fermented. Microbiological assays for penicillin indicated the following values at various times during the procedure:

| Incubation period, days | Penicillin content (Oxford units per ml. of fermentation medium) |
| --- | --- |
| 2 | 17 |
| 3 | 35 |
| 4 | 47 |
| 5 | 50 |

Example II

In a 9-liter Pyrex bottle equipped with a perforated aluminum tube to serve as an aeration device there were placed 5 liters of sterile fermentation medium containing corn-steeping liquor (30° Baumé)—300 ml., $MgSO_4.7H_2O$—1.125 g., $KH_2PO_4$—2.250 g., $NaNO_3$—18.0 g., $ZnSO_4.7H_2O$—0.200 g., and lactose—200.0 g. The medium was inoculated with 500 ml. of a suspension of mycelium of *Penicillium notatum* prepared by germinating spores of this organism in a medium of the same composition as that used in the Pyrex bottle. During germination of the spores, this medium had been constantly agitated on a Ross-Kershaw laboratory shaking machine so as to cause the mold mycelium to grow submerged in the medium.

After inoculation of the 5-liter portion of medium, it was aerated by blowing sterile air through the perforated aluminum tube, the aeration rate being 10 liters per minute. This degree of aeration served to keep the medium and organism thoroughly mixed throughout the fermentation period. The temperature was maintained at 23° to 25° C. throughout the fermentation. Samples removed periodically for microbiological assay showed the following penicillin contents:

| Incubation period, days | Penicillin content (Oxford units per ml. of fermentation medium) |
|---|---|
| 2 | 20 |
| 3 | 37 |
| 4 | 51 |
| 5 | 57 |
| 6 | 61 |

Example III 32 liters of fermentation medium of the same composition as used in Example I was placed in a stationary vat-type fermenter provided with a motor-driven propeller-type agitator and an aloxite air diffusion tube near the bottom of the vat. After inoculation of the medium with 3 liters of a suspension of spores of *Penicillium notatum*, the agitator was kept in constant operation, revolving at approximately 200 R. P. M., and sterile air was blown through the diffusion tube at a rate of 15 liters per minute. Foaming was controlled in the conventional manner by the addition of a few drops of lard oil. A temperature of 24° C. was maintained throughout the fermentation period. Samples removed periodically for microbiological assay showed the following penicillin contents:

| Incubation period, days | Penicillin content (Oxford units per ml. of fermentation medium) |
|---|---|
| 2 | 19 |
| 3 | 33 |
| 4 | 51 |
| 5 | 62 |
| 6 | 65 |

Example IV

A nutrient medium was prepared by dissolving 20.0 g. of lactose (U. S. P.), 3.0 g. of sodium nitrate, 0.25 g. of MgSO₄.7H₂O, 0.50 g. of KH₂PO₄, 0.044 g. of zinc sulfate, 0.35 g. of corn starch, and 40 ml. of concentrated corn-steeping liquor (30° Baumé), in sufficient water to make a total volume of one liter. After thorough mixing, 125 ml. aliquots were dispensed into 300 ml. Erlenmeyer flasks which were plugged with cotton and steam sterilized in the conventional manner. After cooling to room temperature, each flask was inoculated with ungerminated spores. Similar cultures were prepared for three different Penicillium species, i. e., *P. notatum* Westling, NRRL 832, *P. chrysogenum* Thom NRRL 807, and *P. cyaneo-fulvum* Biourge NRRL 838. 1.5 g. of sterile CaCO₃ was added to each culture just before inoculation. The flasks were then placed on a Ross-Kershaw shaking machine which imparted a whirling motion to the liquid medium. (The shaking table revolved at about 200 revolutions per minute.) These fungi grew in the submerged state and produced penicillin readily, as is shown by the following assay values, obtained at various intervals:

| Organisms | Culture age, days | | |
|---|---|---|---|
| | 3 | 5 | 7 |
| | Oxford units per ml. of fermented medium | | |
| *P. notatum* NRRL 832 | 9 | 24 | 53 |
| *P. chrysogenum* NRRL 807 | 4 | 7 | 15 |
| *P. cyaneo-fulvum* NRRL 838 | 6 | 15 | 21 |

Example V

A nutrient medium was prepared by dissolving 20.0 g. of lactose (U. S. P.), 3.0 g. of NaNO₃, 0.25 g. of MgSO₄.7H₂O, 0.50 g. of KH₂PO₄, 0.044 g. of zinc sulfate, and 8.0 g. of whey powder in sufficient water to make one liter. The cultures were prepared as described in Example IV, and inoculated with ungerminated spores of *P. notatum* Westling NRRL 832. 1.0 g. sterile CaCO₃ was added to each culture just prior to inoculation. These cultures were placed on a Ross-Kershaw shaking machine, so that a submerged growth of the fungus was obtained. The effect of the whey powder in the culture medium is shown by the results given in the following table:

| Incubation period, days | Penicillin yields (Oxford units per ml.) | |
|---|---|---|
| | Control | +Whey powder |
| 4 | 2 | 11 |
| 5 | 4 | 16 |
| 7 | 5 | 25 |

Example VI

A nutrient medium was prepared by dissolving 20.0 g. of brown sugar (sucrose), 3.0 g. of NaNO₃, 0.25 g. of MgSO₄.7H₂O, 0.5 g. of KH₂PO₄, and 10.0 g. of trypsin hydrolyzed casein in sufficient water to make one liter. The cultures were prepared as described in Example IV, and inoculated with ungerminated spores of *P. notatum* Westling, NRRL 832. 1.0 g. of sterile CaCO₃ was added to each culture just prior to inoculation. These cultures were grown at 24° C. on the Ross-Kershaw shaking machine, so that a submerged growth of the fungus was obtained. The effect of the hydrolyzed casein as a component of the culture medium is shown by the results given in the following table:

| Incubation period, days | Penicillin yields (Oxford units per ml.) | |
|---|---|---|
| | Control | +Hydrolyzed Casein |
| 3 | 2 | 12 |
| 4 | 4 | 21 |
| 5 | 5 | 23 |

Example VII

A nutrient medium was prepared by dissolving 3.0 g. of NaNO₃, 0.25 g. of MgSO₄.7H₂O, 0.50 g. of KH₂PO₄, 0.044 g. zinc sulfate and 40 ml. of concentrated corn-steeping liquor, and sufficient water added to make one liter. To 100 ml. aliquots in 300 ml. Erlenmeyer flasks, 2.0 g. of lactose, glucose, sucrose, sorbitol or glycerine was added. These flasks were plugged with cotton and sterilized in the conventional manner. When cooled, each flask was inoculated with ungerminated spores of P. notatum Westling NRRL 832, and incubated at 24° C. on the Ross-Kershaw shaking machine, so that a submerged fungus growth was obtained. Samples were removed periodically for microbiological assay, which showed the following penicillin content.

| Carbon source | Incubation period, days | | |
|---|---|---|---|
| | 3 | 5 | 7 |
| | (Oxford units per ml. of fermented liquid) | | |
| Lactose | 15 | 54 | 72 |
| Sucrose | 6 | 17 | 27 |
| Glucose | 4 | 18 | 34 |
| Sorbitol | 4 | 17 | 23 |
| Glycerine | 4 | 14 | 20 |

Having thus described my invention, I claim:

1. A method for the production of penicillin comprising submerging a penicillin-producing mold in an aqueous nutrient medium containing from 5 to 100 g. of a source of assimilable carbon per liter of medium and a degraded proteinaceous material, and maintaining agitation and aeration throughout the inoculated medium so as to disperse oxygen therethrough at a temperature of 23° to 25° C. for a period of time within the range of 2 to 7 days.

2. A method for the production of penicillin comprising submerging a penicillin-producing mold in an aqueous nutrient medium containing from 5 to 100 g. of a source of assimilable carbon and from 5 to 100 g. of a degraded proteinaceous material per liter of medium and containing inorganic nutrients, and maintaining agitation and aeration throughout the inoculated medium so as to disperse oxygen therethrough.

3. A method for the production of penicillin comprising submerging a penicillin-producing mold in an aqueous nutrient medium containing from 5 to 100 g. of carbohydrates and from 5 to 100 g. of a degraded proteinaceous material per liter of medium and containing inorganic nutrients, and maintaining agitation and aeration throughout the inoculated medium so as to disperse oxygen therethrough at a temperature of 23° to 25° C. for a period of time within the range of 2 to 7 days.

4. A method for the production of penicillin comprising submerging a penicillin-producing mold in an aqueous nutrient medium containing from 5 to 100 g. of a source of assimilable carbon per liter of medium and corn-steeping liquor, and maintaining agitation and aeration throughout the inoculated medium so as to disperse oxygen therethrough at a temperature of 23° to 25° C. for a period of time within the range of 2 to 7 days.

5. A method for the production of penicillin comprising submerging a penicillin-producing mold in an aqueous nutrient medium containing from 5 to 100 g. of lactose per liter of medium and a degraded proteinaceous material, and maintaining agitation and aeration throughout the inoculated medium so as to disperse oxygen therethrough at a temperature of 23° to 25° C. for a period of time within the range of 2 to 7 days.

6. A method for the production of penicillin comprising submerging a penicillin-producing mold in an aqueous nutrient medium containing from 5 to 100 g. of lactose per liter of medium, hydrolyzed casein and inorganic nutrients, and maintaining agitation and aeration throughout the inoculated medium so as to disperse oxygen therethrough at a temperature of 23° to 25° C. for a period of time within the range of 2 to 7 days.

7. A method for the production of penicillin comprising submerging a penicillin-producing mold in an aqueous nutrient medium containing from 5 to 100 g. of lactose, 5 to 100 g. of concentrated corn-steeping liquor per liter of medium and containing inorganic nutrients, and maintaining agitation and aeration throughout the inoculated medium so as to disperse oxygen therethrough at a temperature of 23° to 25° C. for a period of time within the range of 2 to 7 days.

ANDREW J. MOYER.

REFERENCES CITED

The following references are of record in the file of this patent:

UNITED STATES PATENTS

| Number | Name | Date |
|---|---|---|
| 2,006,086 | May et al. | June 25, 1935 |
| 2,098,962 | Hellbach | Nov. 16, 1937 |

OTHER REFERENCES

Clifton, Science, July 16, 1943, pages 69–70.

Reid, Jr., Bacteriology, 1935, pages 215–217.

Moyer and Heatley, A paper distributed to Merck, Squibb, Pfizer, Lederle, and OSRD in New York city on December 17, 1941.

May et al., Jr., Ind. Eng. Chem., May 1934, pages 575–578.

Woodruff et al., Jr., Bacteriology, January 1943, page 30.

Coghill, Monthly Progress, Report No. 3, May 2, 1942.